(No Model.)

J. B. PERKINS.
ANIMAL TRAP.

No. 555,117.  Patented Feb. 25, 1896.

Witnesses
E. H. Monroe
R. M. Smith

Inventor
James B. Perkins
By his Attorneys.
C. A. Snow & Co.

UNITED STATES PATENT OFFICE.

JAMES B. PERKINS, OF LEWISTON, IDAHO, ASSIGNOR OF ONE-HALF TO PATRICK FLANNERY, OF SAME PLACE.

ANIMAL-TRAP.

SPECIFICATION forming part of Letters Patent No. 555,117, dated February 25, 1896.

Application filed February 28, 1895. Serial No. 540,080. (No model.)

*To all whom it may concern:*

Be it known that I, JAMES B. PERKINS, a citizen of the United States, residing at Lewiston, in the county of Nez Perces and State of Idaho, have invented a new and useful Animal-Trap, of which the following is a specification.

This invention relates to an improvement in animal-traps, and it is especially designed for catching and holding the feet of the animal.

The object of my invention is to produce a trap which shall be adapted to catch and hold animals of various sizes by impaling one or both feet of the animal, thus causing loss of blood and consequent weakening of the animal until it no longer has power of resistance, and so remains captured until found by the trapper.

I will proceed to describe my invention by referring to the several figures of the drawings hereto annexed, in which—

Figure 1:
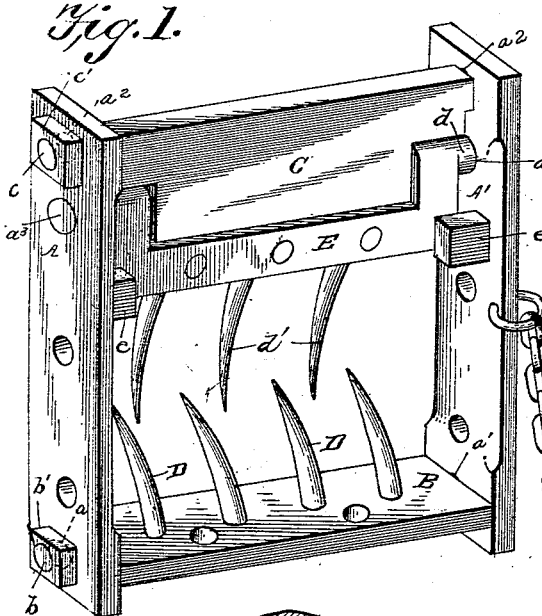
Figure 2:
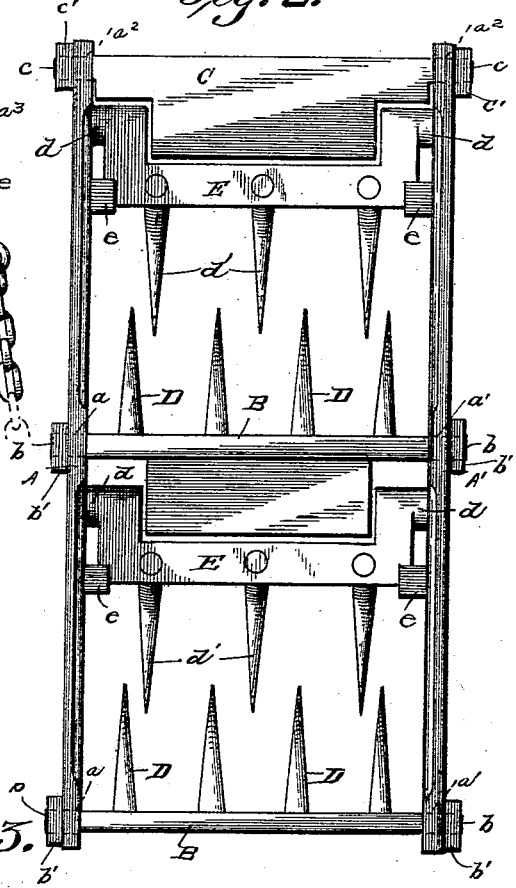
Figure 3:
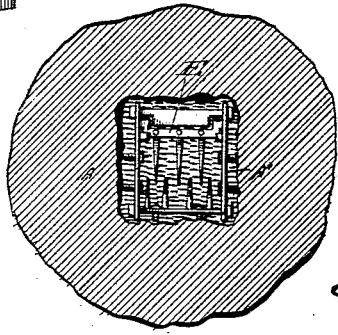
Figure 4:
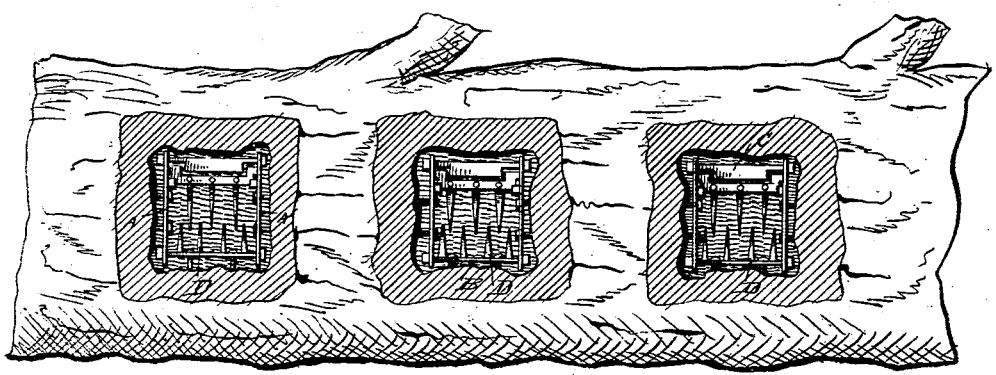

Figure 1 is a perspective view of an animal-trap embracing my invention complete. Fig. 2 represents a double trap especially adapted for larger animals, or where it is desired to engage both feet. Fig. 3 illustrates the manner of applying my improved trap to a hollow log or tree. Fig. 4 shows the manner in which a series of traps may be arranged in a single log to accommodate animals which travel in pairs or in company.

Similar letters of reference designate corresponding parts in all the figures of the drawings.

My trap is made in the form of an open rectangular frame, preferably of metal. A and A' represent the side bars of such frame, and B and C the end bars thereof. I prefer to make these side and end bars all separate from each other for the sake of transportation and as possessing other advantages which will be apparent. The side bars, A and A', are provided each at its lower end with holes $a\ a'$ for the reception of trunnions $b\ b$, formed on the ends of the lower end bar, B, of my trap. These trunnions are screw-threaded, as shown, and after passing through the side bars, as indicated, receive suitable nuts $b'$.

C represents the upper end bar, which is also provided with screw-threaded trunnions $c$, passing through perforations $a^2$ in the upper ends of the side bars, A and A', and $c$ represents the nuts for securing the same.

D D represent spikes or pointed teeth or fingers rigidly attached to the lower end bar, B, and projecting inwardly and slightly rearwardly within the open rectangular frame.

E indicates a rocking bar or swinging frame pivoted within the open frame by means of trunnions $d$, passing through perforations $a^3$ in the side bars, A and A'. The bar E is provided with pointed teeth or fingers $d'$, similar to but preferably slightly longer than the fingers D of the lower bar, B, of the frame. Said teeth project toward the teeth on the bar B, and when in closed position their points preferably lie midway between the points of the teeth D. Thus the bar E is adapted to swing freely rearwardly; but its movement forward is limited by suitable stops $e$, secured within the open frame, preferably to the inner faces of the bars A and A'.

The side bars, A and A', are provided at various points with perforations for the passage of wood-screws, whereby the device as a whole may be secured in place within any suitable opening, as illustrated in Figs. 3 and 4.

In Fig. 2 I have shown a double trap, or one provided with two sets of rigid fingers and two sets of swinging fingers. In this construction it is necessary to make the side bars, A and A', of a length sufficient to receive the increased number of parts, as shown. This trap is especially adapted for catching and holding larger animals or animals that travel in pairs, being capable of engaging both of the front feet of an animal.

It will be apparent that the trap described is simple, strong, and not liable to get out of order, there being no springs or complications of any kind to endanger the free working of said trap. On account of its simplicity and the small number of its parts the weight of a trap of the largest size, such as is suitable for entrapping bears, can be made to weigh less than five pounds. The trap can be set in a hollow tree, log, or stump, being merely screwed within an aperture made in the same. Again, this trap effectively protects its own bait. Bait-robbers—such as birds, squirrels, &c.—in the attempt to steal the bait are forced to enter the trap, which closes behind them and imprisons them. Another great advantage of this trap is that it is impossible to spring the same and make it inoperative. It is always ready for use.

It is often the experience of trappers visiting their traps to find but part of an animal's foot, caused by the doors of the spring-trap compressing the foot until it becomes numb and unconscious of pain, thereby enabling the animal to tear itself loose. The automatic trap works differently. The teeth, penetrating the foot of the animal, cause it to bleed freely, while each plunge it makes in the attempt to free itself causes a fresh flow of blood, rendering the animal weak through the loss thereof, while the foot remains sensitive to pain.

Changes in the form, proportion and the minor details of construction may be resorted to without departing from the principle or sacrificing any of the advantages of this invention.

Having described the invention, what is claimed as new, and desired to be secured by Letters Patent, is—

1. In an animal-trap, an open rectangular frame, a series of pointed teeth having a rigid connection with one bar of said frame, and a rocking bar arranged in substantially parallel relation to the bar which has the fixed teeth, said rocking bar being journaled at its opposite ends in the side bars of the frame and provided with a series of pointed teeth, substantially as and for the purpose described.

2. In an animal-trap, an open rectangular frame, in combination with several series of pointed teeth having a fixed relation thereto, and several series of swinging teeth mounted in and carried by a pivoted, rocking bar in the manner substantially as specified.

3. An animal-trap especially adapted for use in connection with hollow logs and trees, the same consisting of an open rectangular frame, a series of rigidly-attached pointed teeth or fingers projecting inwardly within said open frame, a series of swinging pointed teeth or fingers secured to and carried by a pivoted, rocking bar, the side bars of the open rectangular frame being provided with suitable perforations, whereby the trap may be secured to a hollow log or tree at an aperture made therein, in the manner and substantially as described.

4. In an animal-trap, an open rectangular frame comprising the side bars A and A', end bars B and C, and a series of inwardly-projecting rigid teeth secured to one of said end bars, in combination with a rocking bar, a series of inwardly-projecting teeth carried thereby, and one or more stops e, attached to said rectangular frame, for limiting the outward movement of the rocking bar and its teeth, substantially as and for the purpose specified.

In testimony that I claim the foregoing as my own I have hereto affixed my signature in the presence of two witnesses.

JAMES B. PERKINS.

Witnesses:
EUGENE O'NEILL,
JAMES DE HAVEN.